United States Patent [19]

Barak

[11] 4,044,752

[45] * Aug. 30, 1977

[54] SOLAR COLLECTOR WITH ALTITUDE TRACKING

[75] Inventor: Amitzur Z. Barak, Chicago, Ill.

[73] Assignee: The United States of America as represented by the United States Energy Research and Development Administration, Washington, D.C.

[*] Notice: The portion of the term of this patent subsequent to Sept. 28, 1993, has been disclaimed.

[21] Appl. No.: 601,112

[22] Filed: Aug. 1, 1975

[51] Int. Cl.² .................................................. F24J 3/02
[52] U.S. Cl. ........................................ 126/270; 60/641
[58] Field of Search ............... 126/270, 271; 237/1 A; 60/641; 136/89

[56] References Cited

U.S. PATENT DOCUMENTS

| | | | |
|---|---|---|---|
| 1,951,404 | 3/1934 | Goddard | 126/270 |
| 3,171,403 | 3/1965 | Drescher | 126/270 |
| 3,861,379 | 1/1975 | Anderson, Jr. | 126/270 |
| 3,923,381 | 12/1975 | Winston | 126/271 |

*Primary Examiner*—John J. Camby
*Assistant Examiner*—Larry I. Schwartz
*Attorney, Agent, or Firm*—Dean E. Carlson; Frank H. Jackson; Paul A. Gottlieb

[57] ABSTRACT

A device is provided for turning a solar collector about an east-west horizontal axis so that the collector is tilted toward the sun as the EWV altitude of the sun varies each day. It includes one or more heat responsive elements and a shading means aligned so that within a range of EWV altitudes of the sun during daylight hours the shading means shades the element or elements while during the rest of the daylight hours the elements or elements are heated by the sun to assume heated, stable states. Mechanical linkage between the collector and the element is responsive to the states of the element or elements to tilt the collector in accordance with variations in the EWV altitude of the sun.

10 Claims, 5 Drawing Figures

SOLAR COLLECTOR WITH ALTITUDE TRACKING

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

In a publication entitled "Stationary Mirror Systems for Solar Collectors" by H. Tabor which appears in *Solar Energy*, Vol. II, Nos. 3–4, July–October 1958, at pages 27–33, there is defined an angle in solar geometry called the EWV altitude. In the course of a day, the sun moves over a large angle as it sweeps the sky from sunrise to sunset. It also has a smaller angular movement related to the rise and fall of the sun. In the publication by Tabor this smaller angular variation due to the altitude variation of the sun, which is both a daily and annular phenomenon is termed EWV altitude. Correction of solar collector position to account for the variation of EWV altitude is usually limited to variation in the seasonal tilt of the collector in accordance with the changes in the declination angle of the sun for a particular location. Correction for daily changes in the sun's altitude which would permit a reduced angle of acceptance for a cylindrical, solar radiant energy collector has not been practicable due to the involved equipment necessary. In cylindrical, radiant energy collectors, such as described in a publication by R. Winston appearing in *Solar Energy*, Vol. 16, No. 2, at pages 89–95, (1974) and in a prior U.S. application Ser. No. 492,074, entitled "Radiant Energy Collector," filed on July 25, 1974, now U.S. Pat. No. 4,002,499 and in the above-referred Tabor article, the collector configuration is determined by the angle of acceptance. The concentration factor is roughly inversely proportional to this angle so that the greater the angle, the less the concentration factor but the longer is the period of collection. If a collector could be provided which would allow reduced angle of acceptance without decrease in the hours of collection, higher concentration and simplified design of the collector would be achieved. In particular, in nonimaging cylindrical collection devices, the high concentration factors which are attainable are off-set by the large reflective surface area required for high concentration. By providing a means for varying the daily tilt of the collector according to the variation in the sun's EWV altitude, a truncated, cylindrical collector, i.e. one with shortened side walls and therefore less reflector area, can achieve as good a concentration as the untruncated collector. Thus the reflector utilization factor is improved. Improvement in the reflector utilization factor is also obtained in other concentrators, with increased concentration.

It is therefore an object in this invention to provide an improved solar collector.

Another object of this invention is to provide a means for varying the tilt of a solar, radiant energy collector in response to the daily variation in the sun's EWV altitude.

SUMMARY OF THE INVENTION

A device is provided for rotating a cylindrical solar collector about an axis which runs east to west so that the collector is tilted towards the sun as the EWV altitude of the sun varies each day. It includes a heat responsive element which is coupled to the collector. Means are provided for shading this heat responsive element so that with the sun within a certain range of altitudes the element is heated while at other altitudes the element is unheated. When the element is heated, it assumes a heated stable state and exerts a force on the collector to cause the collector to rotate about the axle to the desired tilt. When the element is unheated, the collector assumes another position. Thus, with a single element a two position device is provided. Daily variation in the declination of the sun may be compensated for with additional tilting means. Three position compensation for the altitude of the sun can be provided by utilizing two heat responsive elements.

DETAILED DESCRIPTION OF THE PREFERRED EMBODIMENT

Figure 1:
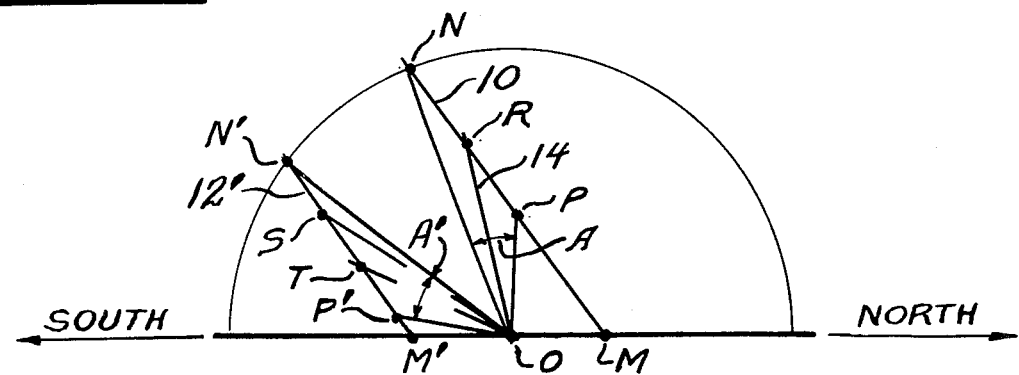
FIG. 1 is a projection of the sun's trajectory on a vertical, north-south plane with respect to an observer.

Referring to FIG. 1 there is illustrated the position of the sun in the northern hemisphere projected onto a north-south plane, which includes the polar axis, with respect to an observer positioned at point 0. The illustration of the sun's position in the southern hemisphere is the same except north and south are reversed. Line 10 represents the projection of the sun's path at summer solstice with point M being sunrise and sunset, point N being solar noon and point P being midmorning and mid-afternoon positions such as 8:00 A.M. and 4:00 P.M. Line 12 represents the path of the sun at winter solstice with point M' being sunrise and sunset, N' being solar noon and point P' being the same time as point P, say 8:00 A. M. and 4:00 P. M. The EWV altitude angle refers to the altitude of the particular points of the sun's position with respect to the horizontal. In cylindrical, solar energy collectors, the designed acceptance angle determines the hours of collection, with minimum daily hours of collection being at either solstice. Suppose the hours of collection at either solstice are to be from 8 to 4, then energy radiated by the sun at EWV altitudes between points P and N or points P' and N' determines the angle of acceptance. Therefore, the angle of acceptance would be angle A or angle A' which are of the same value. For a cylindrical nonimaging collector, this is more particularly defined in a publication referred to above by Winston. For imaging parabolic, cylindrical collectors, the design is more particularly described in the article by Tabor. Generally, an external mechanism is provided for tilting the collector to correct for changes in the sun's declination so that its optical axis is directed generally to the center of the angle of acceptance. At summer solstice, this would correspond to line 14 which passes through point R. The concentration factor of such cylindrical collectors is roughly inversely proportional to the acceptance angle. Thus, increasing this angle to increase the hours of collection decreases concentration, while decreasing the angle of acceptance to increase concentration, decreases the hours of collection. According to the invention herein disclosed, a mechanism is provided for rotating the collector to allow for a reduction in the angle of acceptance without decrease in the hours of collection. For example, in FIG. 1 with a collector having an angle of acceptance of A/2, rotation between two positions would give the same hours of collection as a collector having an acceptance angle A without rotation between two positions. The two positions would be, first, where the collector was receiving energy from the sun while the sun was at EWV altitudes between points P and R which would occur in the morning and the afternoon, and, second, where the collector was receiving energy from the sun while the sun was at EWV altitudes between points R and N which would occur at midday.

Figure 2:
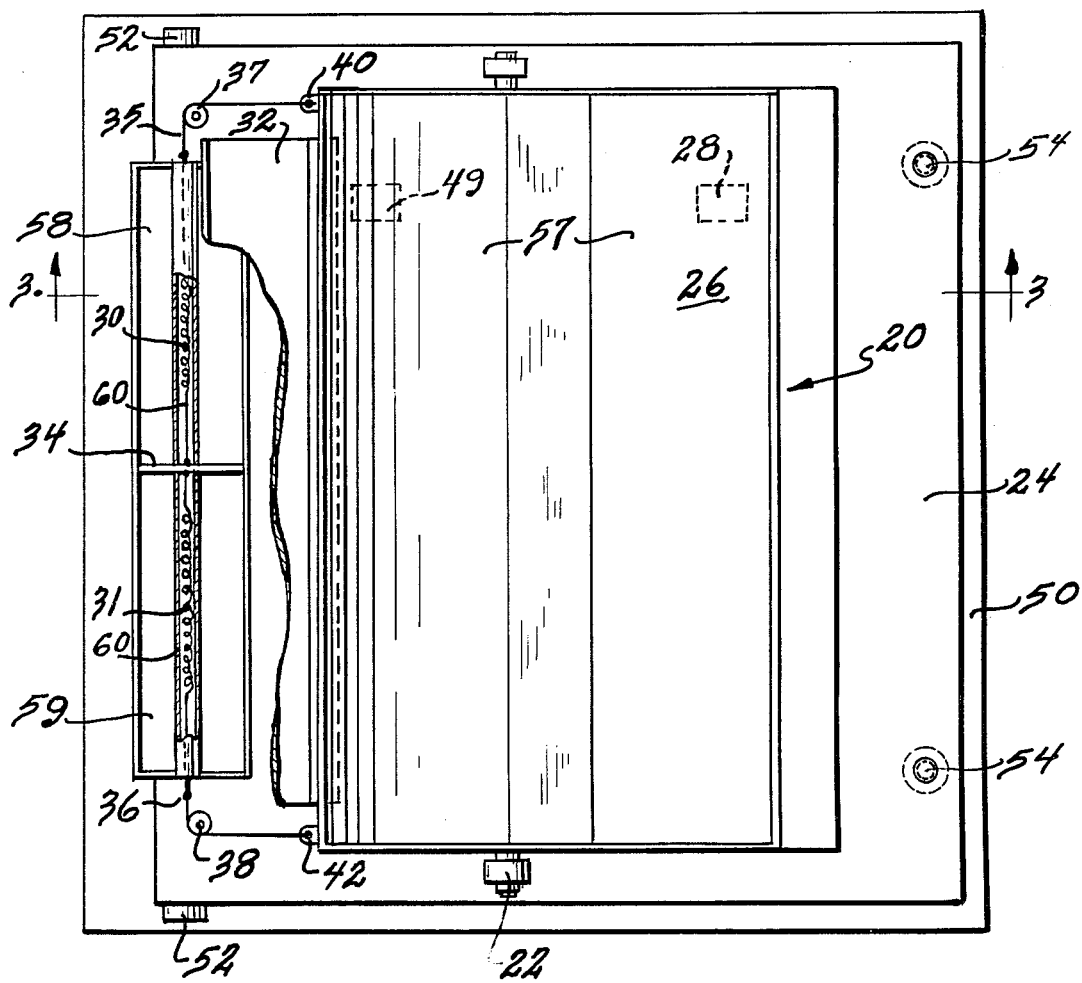
FIG. 2 is an overhead view of a collector utilizing a single heat responsive element.
Figure 3:
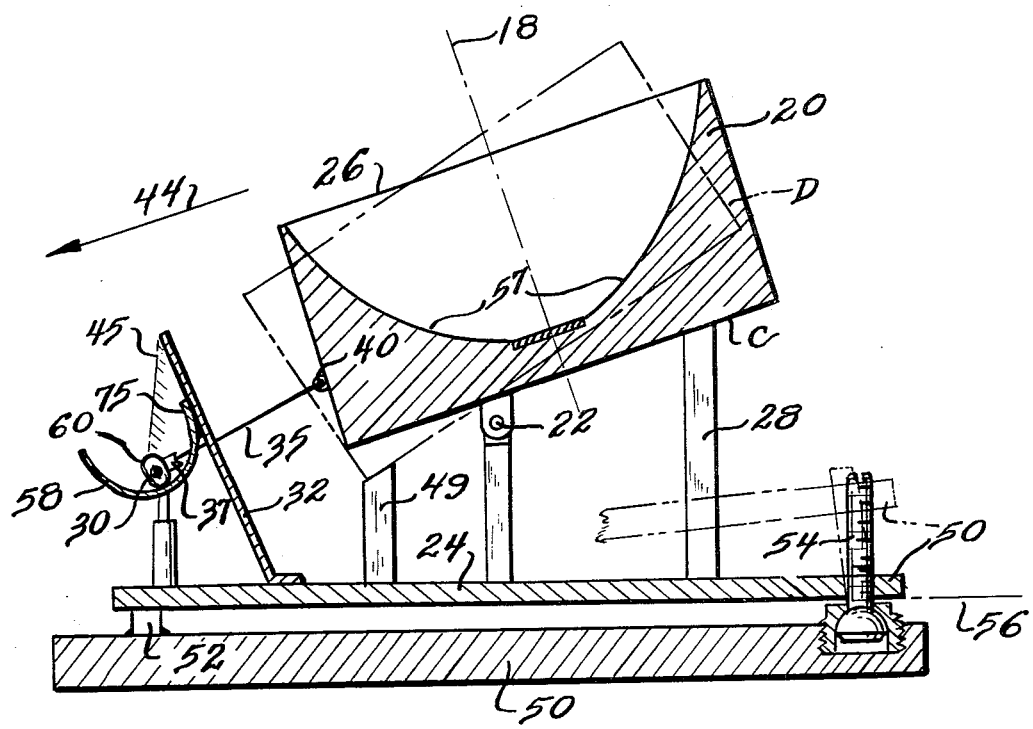
FIG. 3 is a section along line 3—3 of FIG. 2.

Referring to FIG. 2 and FIG. 3, there is shown a mechanism for rotating a collector 20 between two positions each day to account for the variation in EWV altitude of the sun. The collector 20 is mounted on axle 22 which is supported by frame 24. The solar collector, which is a device which absorbs and often concentrates energy received at its frontal face 26, is capable of rotating about axle 22. Axle 22 may be positioned away from the center of gravity of collector 20 so that collector 20, due to its own weight, will tend to turn about axle 22. Alternatively a spring or counterweight may be used to give collector 20 a biased position. Stop post 28 limits this tendency so that under no other mechanical influences collector 20 will tend to be in position C shown by the solid lines in FIG. 3.

Positioning of axle 22 with respect to the earth's polar axis should allow generally for rotation of collector 20 from north to south and from south to north about an east-west horizontal axis. Thus, axle 22 should be generally oriented east to west. The mechanical means for varying the collector tilt includes two heat expansive elements 30 and 31 which are positioned on one side of shadow plate 32, which is mounted on frame 24. Each element 30 and 31 is anchored at one end to anchor plate 34 extending from plate 32. The other end of each element 30 and 31 is coupled to cables 35 and 36 respectively. Cables 35 and 36 extend around rollers 37 and 38 respectively, which are also mounted on frame 24, and each cable is coupled to one end of collector 20 at points 40 and 42.

Elements 30 and 31 have two states corresponding to being heated by incident solar radiation and not being heated by incident solar radiation. The states are normally differentiated by the different length of the elements or by the differing rigidities of the elements in the two conditions. In U.S. Pat. No. 3,982,526, Sept. 28, 1976, entitled "Turning Collector for Solar Radiation," various heat expanding and contracting elements are described which could be utilized to practice this invention. For example, in the embodiment shown in FIG. 1 and FIG. 2 elements 30 and 31 might be of Nitinol which is an equiatomic nickel-titanium metallic alloy which is a memory alloy and, when cold, elements 30 and 31 might be limp and exerting almost no force on collector 20 through cables 35 and 36. However, when heated the Nitinol would have a memory requiring it to contract thereby exerting a force in the direction of arrow 44 on collector 20.

Whether elements 30 and 31 are heated by the sun, is determined by shadow line 45 which is where the shadow cast by shadow plate 32 first intersects elements 30 and 31. Consider operation of the device with a collector having no adjustment for seasonal changes in the declination of the sun, that is no device for varying seasonal collector tilt. With shadow line 45 coplanar with the path of the sun on equinox, the embodiment of FIG. 2 and FIG. 3 provides for changing collector tilt on an annular basis. That is, when the sun is on the summer side of shadow line 45, i.e. to the right of line 45 in FIG. 2, elements 30 and 31 are shaded by plate 32 and the collector remains in position C. When the sun is on the winter side of line 45, i.e. to the left of line 45 in FIG. 2, elements 30 and 31 are radiated by the sun and assume the memory condition forcing collector 20 to rotate about axle 22 to assume position D limited by stop 49, as shown by the phantom lines in FIG. 2. Thus, the mechanism described can be used to vary the seasonal tilt of the collector to provide for improved collector concentration and efficiency.

Greater improvement in collector performance is attainable using the described device to vary the daily tilt of collector 20 in accordance with the variation in EWV altitude of the sun. To accomplish this a mechanism must be provided to vary collector tilt in accordance with changes in the declination of the sun. In FIG. 1 this refers to a mechanism for varying the angle over which the collector collects between the summer solstice position limited by line OP and the winter solstice position limited by line OP'. The seasonal tilt might be varied by mounting frame 24 on base 50 with the side of frame 24 closest the equator mounted on pivot 52 and the other side of frame 24 resting on screw 54. By turning screw 54 the tilt of frame 24 with respect to the horizontal axis 56 may be varied. Of course, there is a wide variety of means for varying the tilt of the collector. The tilt is varied so that shadow line 45 is directed along a line which subtends the overall angle of acceptance of the two-position collector 20. Thus at summer solstice line 45 would fall along line 14. Between the hours when the sun is EWV altitude is between points P and R in the morning and late afternoon, elements 30 and 31 are shaded and thereby collector 20 is at position C. Between the hours when the sun's EWV altitude is between points R and N, the elements 30 and 31 are radiated, and collector 20 is forced to position D. Collector 20 with two daily tilt positions can ideally have half the angle of acceptance of a device having an angular acceptance of A and still have the same hours of optimal collection. Further, the reflector area of collector 20 per unit area normal to the solar rays may be reduced by truncating the collector side walls 57, thus possibly reducing overall cost.

Figure 4:
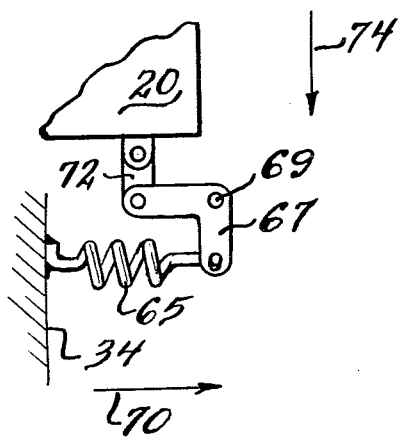
FIG. 4 shows another means for coupling the heat responsive element to the collector.

To assure that when elements 30 and 31 are heated adequately when exposed to radiant energy from the sun they can be positioned at the absorber position of a cylindrical nonimaging collectors 58 and 59 of a type described in the "Radiant Energy Collector" application previously referred to. For example, Nitinol elements might be coiled within flattened oval tubes 60 which are of an absorbant material with the shape of the walls of collectors 58 and 59 determined by the shape of tubes 60. Of course, other materials besides Nitinol can be used as heat-responsive elements. The elements may be contracting or expanding. Examples of such heat responsive elements are shown in the previously recited U.S. patent entitled "Turning Collectors for Solar Radiation". The problem becomes one of properly linking the elements to the collector so that heat motion of the element can be made to rotate the collector. For example, if the elements 30 and 31 are expansive when heated the linkage shown in FIG. 4 might be used. Here element 65 is anchored to anchor plate 34 and coupled to collector 20 by a linkage. The linkage includes an "L" link 67 which pivots about a fixed point 69. With expansion of element 65 in the direction of arrow 70 force is exerted on link 72, moving collector 20 in the direction of arrow 74. Further, one could utilize one element in place of elements 30 and 31. Two elements however will tend to equalize the angular momentum exerted on the collector 20. In FIG. 2 and FIG. 3 the collectors 58 and 59 are nonimaging, cylindrical collectors. Since such a collector has side walls 75 these walls can be used to shade elements 30 and 31 in place of plate 32.

Figure 5:
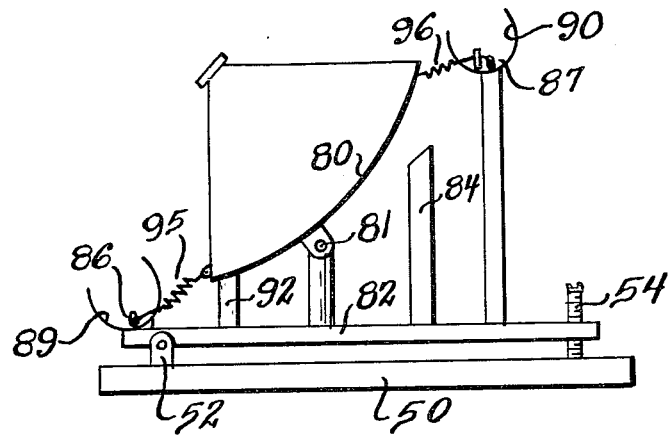
FIG. 5 shows another embodiment of the invention utilizing two heat-responsive elements.

The embodiment shown in FIG. 2 and FIG. 3 is for a two-position device. The embodiment shown in FIG. 5 provides the three-position device. Here the collector 80 is cylindrical, imaging collector. The collector is mounted on axle 81 which, in turn, is mounted on frame 82. The axle 81 is off-centered so collector 80 has a tendency to rotate to its stop post 84 so that undesirable nighttime rotation of collector 80 due to wind is reduced. There are two sets of elements comparable to the single set of elements 30 and 31 of FIGS. 2 and 3. Each set 86 and 87 is positioned at the receiver position of a cylindrical collector 89 and 90 respectively. Collectors 89 and 90 are oriented to direct incident radiant energy on the element sets 86 and 87 at different periods of the day determined by the EWV altitude of the sun. Seasonal tilt of the collectors may be provided by means similar to that shown in FIG. 2. The overall acceptance angle, such as angle A' of FIG. 1, is divided into three sections. At winter solstice these three sections might be defined by points S and T. Between the hours when the sun is between points T and P', element 86 is radiated and collector 80 is forced to an extreme position limited by stop 92. Between the hours when the sun is between points T and S, element 87 is also radiated with overlap of illumination with the element 86. Then collector 80 assumes a middle position. The fact that both elements 86 and 87 may be exerting force on collector 80 requires that either springs 95 and 96 be coupled between the elements and the collector to balance the opposing forces or that the elements themselves have an inherent flexibility. The operation of these springs is similar to that described in the "Turning Collectors for Solar Radiation" application previously referred to. Between the hours when the sun is between positions S and N' element 87 is illuminated and the collector is turned against stop 84. With the three-position device the actual acceptance angle of collector 20 can ideally be one third of angle A', the overall acceptance angle. Of course the device could be set up so that during the middle period neither element is illuminated and the collector will assume the middle position.

It is to be understood that any solar collector can be turned in accordance with variations in the EWV altitude of the sun by utilizing the mechanism herein described. The number of positions through which the collector may be rotated is not limited to two or three but is usually one more than the number of sets of heat responsive elements. The heat responsive elements may be of a wide variety of devices including bimetallic elements, gas-filled bellows, or bimetallic elements with responsive electromagnetic circuitry. Examples of these elements are to be found in the Turning Collectors for Solar Radiation application previously referred to. Further the elements can be such that the two states assumed by the element directly forces the rotation of the collector rather than using the off-center mounted collector or a counterweight to cause the collector to assume one state.

The embodiments of the invention in which an exclusive property or privilege is claimed are defined as follows:

1. A device for turning a solar energy collector about an east-west axis between at least two positions so that the frontal face of the collector is directed approximately towards the sun as the altitude of the sun varies, comprising, axle means upon which the collector is mounted free to rotate thereabout with the frontal face directed skyward, said axle means being aligned so that rotation of the collector thereabout is in a north-south direction, a frame, a first heat responsive element which with solar radiation incident thereupon assumes a first stable state, and fixed shadow means for shading said first element from the sun's radiant energy with the sun within a first range of altitudes of the sun and for allowing the sun's radiant energy to be incident upon said first element within a second range of altitudes of the sun, said first element being responsive to being shaded by said shadow means to assume a second stable state, said first element being so coupled to the collector and said frame that in response to said first element being in said first state due to being radiated by said sun within said second range, the collector is rotated about said axle means to assume a first position whereby the collector's frontal face is approximately directed towards said second range of altitudes of the sun, and that in response to said first element being in said second state due to being shaded by said shadow means with the sun within said first range the collector is rotated about said axle means to assume a second position whereby the collector's frontal face is approximately directed towards said first range of altitudes of the sun.

2. The device of claim 1 further including means for varying the tilt of the collector according to the seasonal variation in the declination angle of the sun.

3. The device of claim 2 wherein said collector is a cylindrical radiant energy collector having a particular angle of acceptance.

4. The device of claim 3 wherein the angles with respect to said cylindrical collector defined by said first and second ranges of altitudes of the sun are equal.

5. The device of claim 4 wherein the angle of acceptance of said cylindrical collector is equal to said angle defined by each of said first and second ranges of altitudes.

6. The device of claim 5 wherein said collector has a truncated reflector.

7. The device of claim 3 further including a second heat responsive element which with solar radiation incident thereupon assumes a first stable state, said shadow means shading said second element from the sun's radiant energy with the sun within said second range of altitudes and allowing the sun's radiant energy to be incident upon said second element within said first range of altitudes of the sun, said second element being responsive to being shaded by said shadow means to assume a second stable state, said shadow means allowing equal radiation and shading of said elements with the sun within a third range of altitudes, said third range being between said first and second ranges, said second element being so coupled to the collector and said frame that in response to said second element being in said first state due to being radiated by said sun within said first range the collector is rotated about said axle msans with the collector's frontal face directed towards said first range of altitudes of the sun, and in response to both of said elements being equally radiated and shaded due to the sun being within said third range the collector is rotated about said axle means to assume a third position whereby the collector's frontal face is approximately directed towards said third range.

8. The device of claim 7 wherein the angles defined by said first, second and third ranges with respect to said collector are all equal.

9. The device of claim 8 wherein said shadow means includes first and second cylindrical nonimaging secondary solar collectors with said first and second elements being positioned at the energy absorber location of said first and second secondary collectors, respectively, said first secondary collector being aligned so that the acceptance angle thereof extends over at least said second range and said secondary collector being aligned so that the acceptance angle thereof extends over at least said first range.

10. The device of claim 9 wherein said first element is of Nitinol.

* * * * *